United States Patent
Tzeng (10) Patent No.: US 8,902,793 B2
(45) Date of Patent: Dec. 2, 2014

(54) METHOD AND SYSTEM FOR A LOW-COMPLEXITY SPANNING TREE ALGORITHM IN COMMUNICATION NETWORKS

(75) Inventor: Shr-Jie Tzeng, Cupertino, CA (US)

(73) Assignee: Broadcom Corporation, Irvine, CA (US)

( * ) Notice: Subject to any disclaimer, the term of this patent is extended or adjusted under 35 U.S.C. 154(b) by 1082 days.

(21) Appl. No.: 11/675,374

(22) Filed: Feb. 15, 2007

(65) Prior Publication Data

US 2008/0198769 A1 Aug. 21, 2008

(51) Int. Cl.
H04L 12/28 (2006.01)
H04L 12/705 (2013.01)
H04L 12/701 (2013.01)
H04L 12/46 (2006.01)
H04L 12/753 (2013.01)

(52) U.S. Cl.
CPC ............... *H04L 45/00* (2013.01); *H04L 45/18* (2013.01); *H04L 12/462* (2013.01); *H04L 45/48* (2013.01)
USPC .......... 370/256; 370/401; 709/223; 709/238; 709/239

(58) Field of Classification Search
USPC ................................................ 370/256, 258
See application file for complete search history.

(56) References Cited

U.S. PATENT DOCUMENTS

| 6,304,575 | B1 * | 10/2001 | Carroll et al. ................. 370/408 |
| 6,330,229 | B1 * | 12/2001 | Jain et al. ...................... 370/256 |
| 7,346,063 | B1 * | 3/2008 | Herbst ........................ 370/395.7 |
| 2003/0108050 | A1 * | 6/2003 | Black et al. .............. 370/395.51 |

OTHER PUBLICATIONS

Datta et al., Self-stabilizing Depth-first Token Circulation in Arbitrary Rotted Networks, Jul. 1998, Distributed Computing, 13: 207-218.*

* cited by examiner

*Primary Examiner* — Nicholas Sloms
(74) *Attorney, Agent, or Firm* — Oblon, Spivak, McClelland, Maier & Neustadt, L.L.P.

(57) ABSTRACT

Aspects of a method and system for a low-complexity spanning tree algorithm in communication networks may comprise preventing loops in a communications network utilizing a distributed sequential algorithm in which there is a single token. Only a network node in possession of this single token may disable a network port. A spanning tree may be generated based on loop prevention. The network ports that may be disabled may be chosen from a port map, where the port map may be obtained by combining a port map identifying ports that are connected to loops with a port map indicating network ports that are to remain enabled. The loop prevention may be initiated by a root node and a token may be generated by the root node when completing the prevention. Network nodes may reduce ingress data rate during loop prevention.

14 Claims, 5 Drawing Sheets

METHOD AND SYSTEM FOR A LOW-COMPLEXITY SPANNING TREE ALGORITHM IN COMMUNICATION NETWORKS

CROSS-REFERENCE TO RELATED APPLICATIONS/INCORPORATION BY REFERENCE

None.

FIELD OF THE INVENTION

Certain embodiments of the invention relate to computer and communication networks. More specifically, certain embodiments of the invention relate to a method and system for a low-complexity spanning tree algorithm in communication networks.

BACKGROUND OF THE INVENTION

In most current communication networks, a large number of nodes are connected through wireless and wired links into a web of interconnections that make up the network topology. Wireless links may be established and torn down quickly and may possess a short life-time; even wired networks are non-stationary and their topology may vary over time since links are constantly being established and terminated. Although changes in the actual hard-wired infrastructure are infrequent, terminals, switches, computers and other forms of network devices or nodes may be connected and disconnected to existing ports or be integrated into a network at any time. Frequently, both intentionally and unintentionally, networks of any size may contain loops and provide for a mesh-like topology rather than a tree-like topology. Loops may be introduced into the network deliberately in order to provide for redundancy in case of link failure, or unintentionally by overlooking that a node is connected to multiple other nodes that may then form a loop. Ad-hoc and other loosely organized types of networks are inherently mesh networks.

However, for current network technology, a mesh-like topology comprising network loops present a problem for various networking protocols, particularly at Layer 2, the data link layer. For example, a variety of networking functions require information to be broadcast throughout a network. This may typically be achieved by so-called flooding, whereby every switch (or node) forwards a packet or frame intended for broadcast, on all the active links, except for the link on which the packet was received. Clearly, if there are loops in the network, the broadcast packets will eventually arrive back at the sender and be re-sent over the active links. This leads to an accumulation of packets in the network and may ultimately lead to the collapse of the network due to an excessively large number of broadcast packets. This phenomenon is also referred to as a broadcast storm.

To avoid these problems, it is necessary for the network to be organized in a tree-like structure, characterized by the property that only one path exists between any two nodes in the network and hence no loops. This may be achieved by overlaying the network with a virtual tree network, electronically disabling the links that would form loops. Such a tree that includes all the nodes in the network and therefore provides a connection between any two nodes is referred to as a spanning tree, as it spans the network. In some networks, sophisticated algorithms are employed to construct a tree topology in a manner to optimize the network performance. Furthermore, these algorithms are typically dynamic in order to be able to reconfigure the network in case of topology changes due to movement of nodes or link failures, for example. Such algorithms naturally introduce significant complexity into a network and require substantial computing power in comparison to a network that is static and constructed as a tree structure from the onset.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A method and/or system for a low-complexity spanning tree algorithm in communication networks, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for a low-complexity spanning tree algorithm in communication networks. Aspects of a method and system may comprise preventing loops in a communications network utilizing a distributed sequential algorithm in which there is a single token. Only a network node in possession of this single token may disable a network port. A spanning tree may be generated based on loop prevention. The network ports that may be disabled may be chosen from a port map, where the port map may be obtained by combining a port map identifying ports that are connected to loops with a port map indicating network ports that are to remain enabled. The network ports that are to remain enabled may comprise single link ports. The loop prevention may be initiated by a root node and a token may be generated by the root node when completing the prevention. Loops may be detected by using loop discovery frames. Network nodes may reduce ingress data rate during loop prevention.

Figure 1:
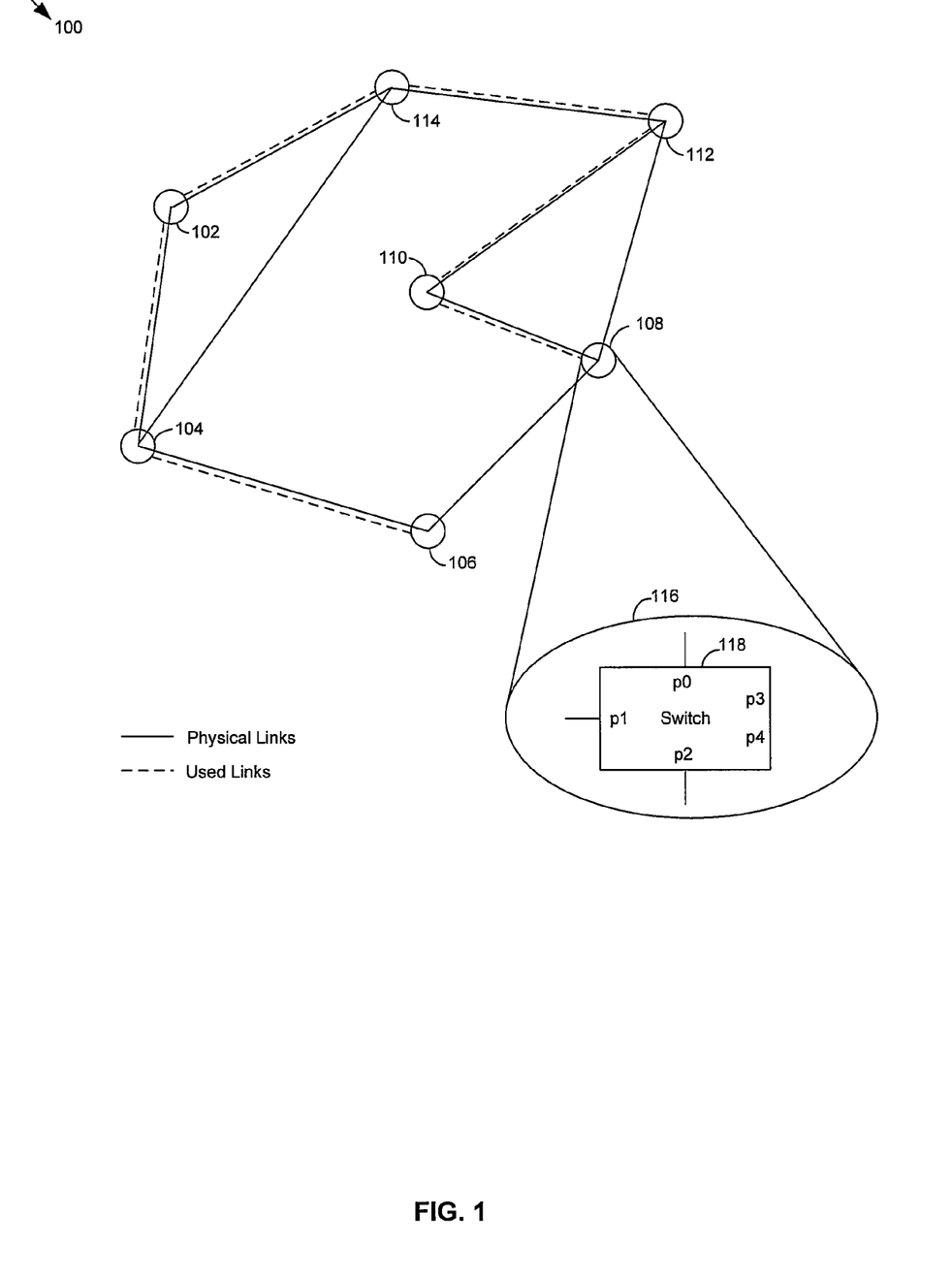
FIG. 1 is a diagram illustrating a general communications network, in accordance with an embodiment of the invention.

FIG. 1 is a diagram illustrating a general communications network, in accordance with an embodiment of the invention. Referring to FIG. 1, there is shown a network 100, comprising network nodes 102, 104, 106, 108, 110, 112 and 114, and an enlargement 116 of network node 108. The enlargement 116 of network node 108 may comprise an exemplary switch 118 with 5 network ports p0, p1, p2, p3 and p4. There is also shown, in FIG. 1, physical links illustrating an exemplary set of connections between the network nodes 102 through 114, and an exemplary set of used links that connect the nodes 102 through 114.

A general data link communications network comprising a plurality of network nodes may be interconnected in a large number of ways. In the exemplary network 100, one exemplary set of connections between network nodes 102 through 114 may be illustrated by the solid lines connecting the network nodes. These solid lines may depict physical connections between network nodes that may be, but are not limited to, twisted-pair, coaxial cable, optical fiber or wireless links. As may be seen in FIG. 1, a general set of interconnections of network nodes may comprise loops (which may sometimes be referred to as cycles). An exemplary loop may be illustrated by the connection path from network node 102 to network node 104, to network node 114 and back to network node 102. A network loop may therefore be characterized as a sequence of connections (that is, a path) between nodes that may lead back to the starting node without the need to cross a link between two nodes twice. Alternatively, it may be seen that a loop introduces multiple paths that may connect a pair of nodes together.

Loops may be introduced into a communications network topology 100 both intentionally and accidentally. A network designer may intentionally introduce multiple paths, loops or parallel connections, in order to provide for redundancy in the case of link failure. Equally, it may be envisaged that a network end user may accidentally introduce loops into the network topology by connecting a plurality of network nodes to ports of a switch connected to a building backbone network. Loops, however, may introduce problems in a communications network because of the way that data may be transmitted across the communications network by network nodes. Effectively, the presence of loops may lead to instability of the network whereby an ever-larger number of data packets may flood the network, and may eventually lead to a collapse of the network throughput. It may therefore be very important to avoid loops in the communications network. This may be achieved by disabling certain links in the network to create a loop-free network that may connect all the nodes. Such an overlay of used links on top of the physical links may be referred to as a spanning tree network.

An exemplary spanning tree is illustrated by the dashed lines in FIG. 1. Hence, only the links indicated by the dashed lines may be used to forward data traffic destined for other network nodes. Such a spanning tree of used network links may ensure that there may be only one active path between any pair of network nodes in the network. In a network, the data link layer may comprise switches (sometimes referred to as bridges) as illustrated in the enlargement 116 of node 108. In this example, the switch 118 may comprise ports p0, p1, p2, p3 and p4. Ports p3 and p4 may not be physically connected in the exemplary network 100. The port p0 may connect to the transmission medium that links the network node 108 to the network node 112, port p1 may connect to the transmission medium that links the network node 108 to the network node 110, and port p2 may connect to the transmission medium that links the network node 108 to the network node 106. Based on the spanning tree overlay, however, only port p1 may remain active at network node 108, switch 118. The ports p0 and p2 may be disabled since the links associated with these ports may not form part of the spanning tree. The spanning tree may be managed dynamically and may change if the topology of network 100 changes.

Some algorithms may be used to automatically find an exemplary spanning tree for a particular communications network, for example spanning tree protocol (STP), per-VLAN spanning tree (PVST), and rapid spanning tree protocol (RSPT). These algorithms may typically find a spanning tree of a network by optimizing a cost functions such that certain properties of the resulting spanning tree may be optimized. However, the optimizing nature of these algorithms may require significant computing resources and may typically require a dedicated CPU and associated memory in each network node. For smaller networks like those used, for example, in home networks or small-and-medium-size enterprises (SMEs), optimization of the network performance may be less important than the cost and complexity introduced by sophisticated spanning tree algorithms to achieve loop prevention. For example, the data carrying capacity of individual links in smaller networks may be similar and so it may often be insignificant which link in a loop is disabled to prevent a loop. Hence, it may be of substantial practical interest to employ sub-optimal, low-complexity algorithms that may be capable of autonomous loop prevention in networks.

Figure 2:
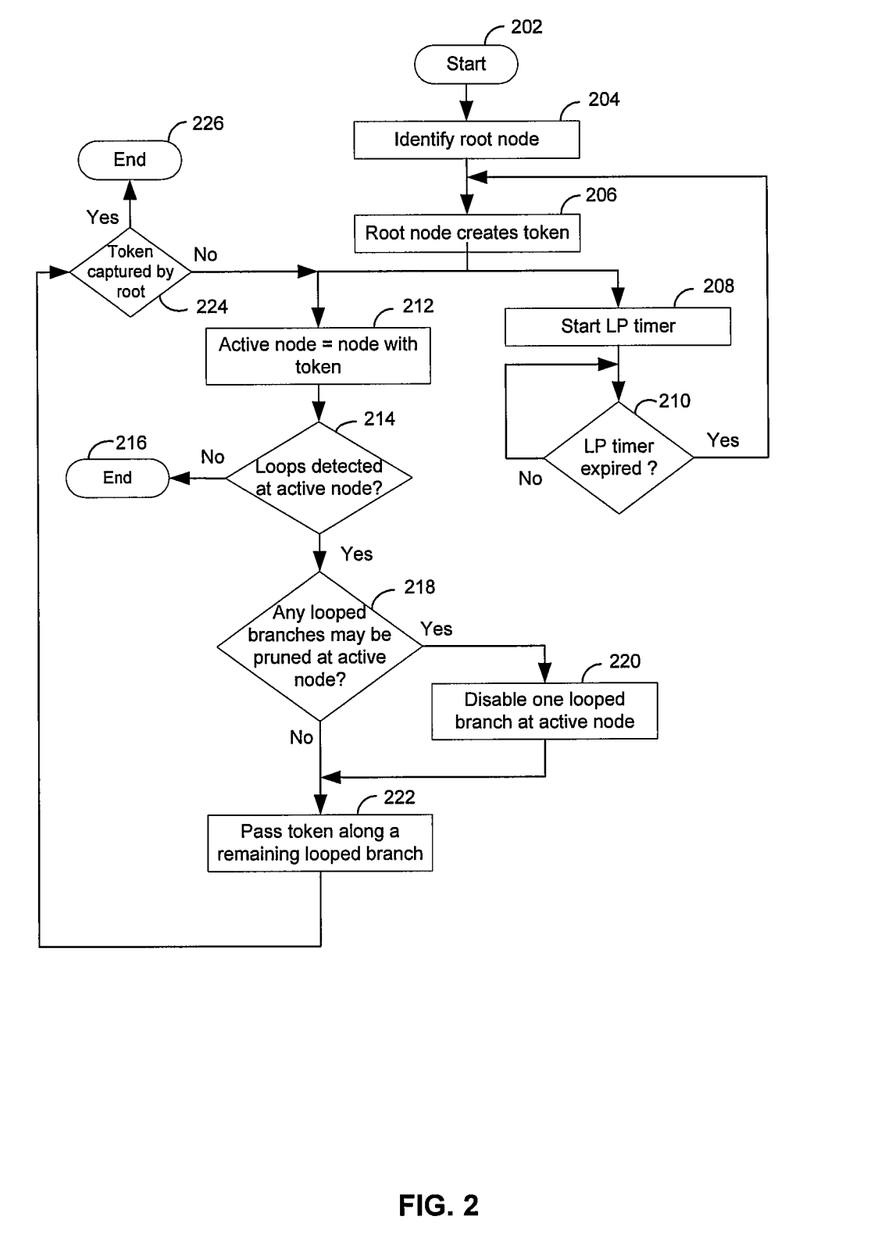
FIG. 2 is a flow chart illustrating the principal functionality of a low-complexity token-based spanning tree algorithm, in accordance with an embodiment of the invention.

FIG. 2 is a flow chart illustrating the principal functionality of a low-complexity token-based spanning tree algorithm, in accordance with an embodiment of the invention. Referring to FIG. 2, there is shown a start step 202, process steps 204, 206, 208, 212, 220 and 222, decision steps 210, 214, 218, and 224, and End steps 216 and 226.

After starting the algorithm in step 202, a root node may be identified in step 204. There may be one root node in the network. The root node may be the controlling entity of the algorithm and may be responsible to initiate the spanning tree and to generate a single token that enables the node in possession of the token to prune network branches that may contain loops. Identifying a root node in step 204 may be achieved by selecting the node with the largest or smallest identification number. A suitable identification number may be a Media Access Control (MAC) address at every node. Root identification may, however, be achieved by any suitable algorithm and is not limited to the aforementioned exemplary approach based on MAC addresses.

Once a root node has been identified in step 204, the root node may create a token. The token may be used to indicate which node may be allowed to prune network branches involved in loops by disabling ports at the switch. Hence, one node in possession of the token may disable ports and the algorithm may therefore be sequential in nature. Since the root may itself be in possession of the token after creating the token, the root node may be the first node to prune network branches.

As soon as the token has been created in step 206, a loop prevention timer (LP) may be started in step 208. The loop prevention timer may set the interval between subsequent initializations of the spanning tree algorithm. When the LP timer expires in step 210, the spanning tree process may be reset and restarted. This mechanism may be necessary to periodically restart the pruning process or also to complete the pruning process if it had not completed in the previous spanning tree algorithm interval. Multiple iterations of the algorithm may, for example, be required if multiple ports at some nodes may need to be disabled in order to avoid all loops in the network.

After the token has been created in step 206, the node in possession of the token, the active node, may commence loop detection and prevention. Initially, the root node may be in possession of the token and may therefore be the active node, as determined in step 212. The active node may then determine in step 214 whether any of its active ports may be connected to a branch of the network with loops. This may include loops that are not directly occurring at the active node but may be reached through the port in question at the active node, as will be detailed in the description for FIG. 5. If no loops have been detected in step 214, the network may be loop-free and the process may be terminated in step 216. If loops have been detected in step 214, the node may need to determine whether the network branch may be pruned in step 218. There may be instances when branches may not be pruned by disabling the corresponding ports, because a portion of the network may be cut off from the rest of the network, as described for FIG. 5. If one or more branches with loops may be pruned in step 218, one port corresponding to a looped branch may be disabled in step 220. In the case of multiple branches that may be pruned, the port to be disabled in step 220 may be chosen by any suitable method. Suitable low-complexity choices may be the lowest or highest port number, for example.

In step 222, the active node may pass a token along on a non-disabled port that indicated loops in step 214. The next node along this path may then capture the token by receiving a token_pass frame and may become the active node in step 212. A token_pass frame is a type of frame that may be used to pass a token from one node to another. The spanning tree construction algorithm may terminate if no further loops are in the network in step 214, if the token is recaptured by the root node in step 224, or if the LP timer expires in step 210.

Figure 3:
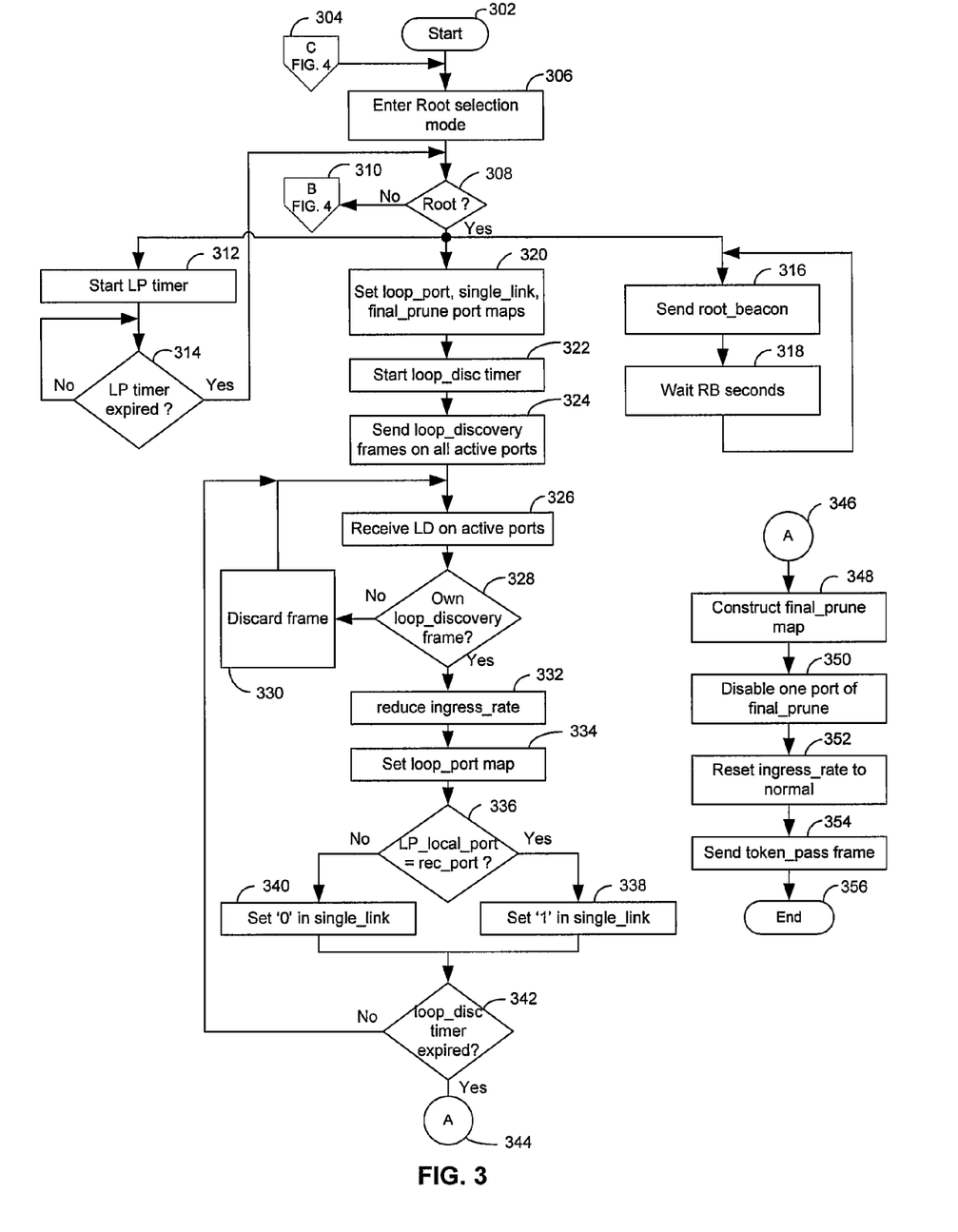
FIG. 3 shows a flow chart illustrating exemplary operation of a root node for loop prevention and construction of a spanning tree, in accordance with an embodiment of the invention.

FIG. 3 is a flow chart illustrating exemplary operation of a root node for loop prevention and construction of a spanning tree, in accordance with an embodiment of the invention.

Figure 4:
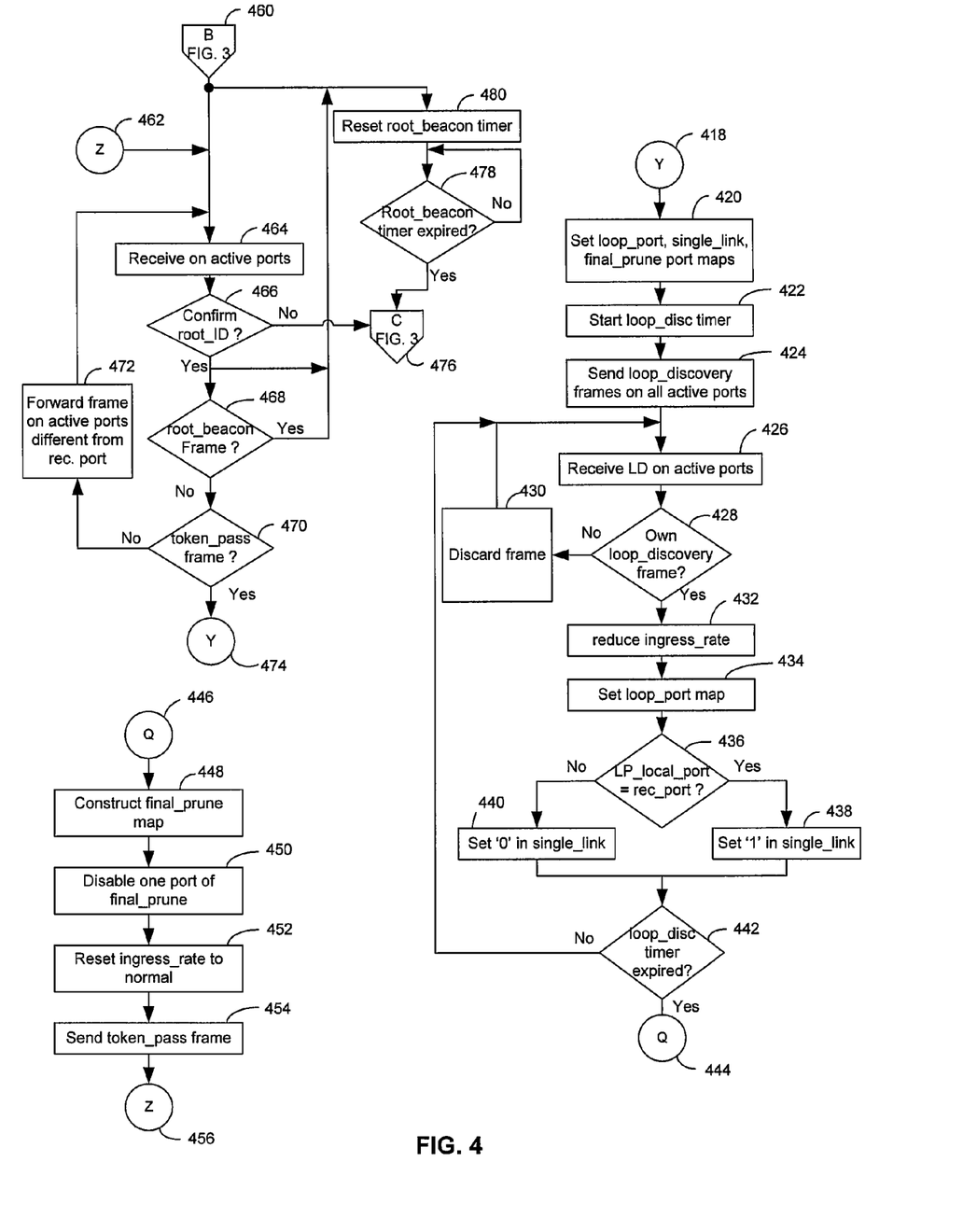
FIG. 4 is a flow chart illustrating exemplary operation of a non-root node for loop prevention and construction of a spanning tree, in accordance with an embodiment of the invention.

To achieve semi-autonomous and distributed functionality as described for FIG. 2, each node may need to be able to be a root node or a non-root node. There may be one root node in the network. FIG. 3 and FIG. 4 are flow charts illustrating an exemplary embodiment of the invention that may be implemented on a network node, whereby FIG. 3 illustrates an exemplary implementation of a root node functionality and FIG. 4 illustrates an exemplary implementation of a non-root functionality.

After step 302, the node may initialize by commencing a root selection process in step 306. As described for FIG. 2, step 204, the root selection process will establish one root node in the network. If in step 308 the node finds that it is a root, the node may commence parallel processes with steps 312, 320, and 316, respectively. Alternatively, if in step 308 the node finds that it is not a root node, further actions may be as shown in FIG. 4, as indicated by the off-page connector 310. This case may be described in detail for FIG. 4.

In step 312, the root node may start a loop prevention (LP) timer. When the LP timer expires in decision step 314, current processes may be interrupted and the node may restart in decision step 308. The purpose of the LP timer, as described for step 208 in FIG. 2, may be the periodic launching of the spanning tree algorithm and hence the loop prevention functionality. The LP timer may in general be chosen long enough to avoid interrupting the loop prevention algorithm before it may terminate naturally.

In step 316, the root may send a frame such as a root_beacon frame. The root_beacon frame may be used to signal to the non-root nodes who the current root is and that the non-root nodes may still be connected to the network. The root node may then wait RB seconds in step 318 before sending the next root_beacon frame. The parameter RB may be a variable parameter. As will be described in FIG. 4, a non-root node that has not received any root_beacon frames over a specified period of time, may conclude that the network topology may have changed and a new root may need to be selected. This may lead to the non-root node initiating a root selection process in step 306.

In step 320, the root node may initialize the port maps loop_port and final_prune to a sequence of zeros, and single_link to a sequence of ones in preparation for loop detection and loop prevention. The port maps loop_port, single_link and final_prune may be considered bit words b(N−1), b(N−2), . . . , b(0), where the number of bits may be equal to the number of ports N at the node and bit b(n) may be assigned to port n. Any other bit assignment may be chosen. The port map loop_port may be used to indicate by logic '1', for example, those ports that may be in looped condition. The port map single_link may be used to indicate by, for example, a logic '1', those ports that may be looped but may not be pruned, and the port map final_prune may be used to indicate, for example, by a logic '1', those ports that are looped and may be pruned. In step 322, the root node may start a timer loop_disc. The loop_disc timer may be used to define the time period over which the root node may keep listening for loop_discovery frames that may indicate loops in the network. The loop_disc timer may be a variable parameter that may depend on the size of the network. If the size of the network is over a certain size and the loop_disc timer short, there may be insufficient time for a loop_discovery frame to travel around a large loop before the root node cedes to listen for loop_discovery frames. In this case, the root node may mistakenly assume that the network may be loop-free. Setting the loop_disc timer much longer than required by the size of the network may correspondingly slow down the loop prevention and spanning tree algorithm.

After starting the loop_disc timer in step 322, the root node may send out frames such as loop_discovery frames on its active ports in step 324. The loop_discovery frames may contain a root_ID, which is a root identifier, node_ID, the ID of the node that may be sending the loop_discovery frame (in this case equal to the root_ID), and the number of the local port over which the outgoing frame may be sent, LP_local_port. The transmitted loop_discovery frames may be received by a network node and may then be forwarded on every active port other than the one on which the loop_discovery frame may have been received. This process may be referred to as flooding. In the case of network loops, the loop_discovery frame may eventually be received again by the transmitting node, the root node, indicating that there may be loops connected to the port from which the original loop_discovery frame may have been transmitted.

After the root node may transmit loop_discovery frames on its active ports in step 324, the root node may switch to receiving mode in step 326 and may listen for any loop_discovery frames that may arrive at any of its active ports. In step 328, if a received frame is different from a loop_discovery frame sent by the root node itself, the frame may be discarded and may be handled elsewhere in the root node. If the received frame is one loop_discovery frames transmitted from the root node as identified by the field node_ID, this may indicate that there are loops in the network. In this case, the root node will reduce the port ingress data rate in step 332. Reducing the ingress data rate of the root node may apply to frames that are not associated with loop discovery, loop prevention and spanning tree construction. This may reduce regular data traffic to a minimum while the looped condition may be resolved. In addition, this may reduce any possible broadcast storms resulting from the looped condition. The ingress data rate may, for example, be reduced by a factor 1/(number of ports of the node).

The received loop_discovery frame may contain an LP_local_port field, which may be a field that may contain the active port over which the loop_discovery frame may have been transmitted. Hence, there may be loops connected to the port named in LP_local_port and the root node may keep track of existing loops by setting the associated bit in the loop_port map to logic '1', in step 334. Furthermore, in step 336, the LP_local_port may also be compared with the port at which the loop_discovery frame may have been received. If the received port is equal to the LP_local_port number, for example m, logic '1' and the current value of the bit b(m) of the single_link port map corresponding to LP_local_port may be combined by a logical 'AND', to give the new value of bit b(m) of the single_link port map in step 338. If the received port is not equal to the LP_local_port number, for example m, logic '0' and the current value of the bit b(m) of the single_link port map corresponding to LP_local_port may be combined by a logical 'AND', to give the new value of bit b(m) of the single_link port map in step 340. In this way, the single_link port map may contain logic '0' only for those ports for which at least one loop_discovery frame has looped back to a receiving port different from the transmitting port in LP_local_port. The ports that may contain a logic '0' in the corresponding position in the single_link port map may be pruned without dividing the network into disjoint sections, as is explained in detail for FIG. 5. If in step 342, the loop_disc timer has not expired, the root node may loop back to step 326 and may continue to receive and process loop_discovery frames. When the loop_disc timer in step 342 expires, the root node may construct the final_prune map from the current single_link and loop_port port maps in step 348, as described in detail for FIG. 5.

In step 350, the root_node may disable one of the ports that have logic '1' in the corresponding position in the port map final_prune. The ingress data rate of the root node, may be reset to its normal operation data rate in step 352. In step 354, the root node may create a token_pass frame and may transmit this frame on one of the remaining looped active ports. Receipt of the token_pass frame by another node may then allow the receiving node to become the active node in the spanning tree construction and loop prevention algorithm. In this manner, the root node may relay the token to another node that may then check for any loops at its ports. This branch of the flow chart may then terminate in step 356. The root node may continue to send out periodic root_beacon messages in steps 316 and 318. Eventually, the LP timer in step 314 expires and the above described loop prevention process may recommence in step 308.

FIG. 4 is a flow chart illustrating exemplary operation of a non-root node for loop prevention and construction of a spanning tree, in accordance with an embodiment of the invention.

To achieve semi-autonomous and distributed functionality as described for FIG. 2, each node may need to be able to be a root node or a non-root node. There may be one root node in the network. FIG. 3 and FIG. 4 are flow charts illustrating an exemplary embodiment of the invention that may be implemented on a network node, whereby FIG. 3 illustrates an exemplary implementation of a root node functionality and FIG. 4 illustrates an exemplary implementation of a non-root functionality.

After root selection in step 306, described for FIG. 3, the node determines whether it may be a root node or a non-root node in step 308. If in step 308 the node is not a root node, the flow chart may continue with the off-page connector 310 that may connect to the off-page connector 460 in FIG. 4. The non-root node may initially reset the root_beacon timer in step 480. A root_beacon frame may need to be received periodically by the non-root node to confirm that the identity of the root node may not have changed and that there may not have been any network topology changes. Every time the root node identity is confirmed, the root_beacon timer may be reset in step 480. In step 478, the non-root node may verify that the root_beacon timer has not expired. If in step 478 the root_beacon timer has expired, the non-root node will trigger root selection mode 306 via off-page connector 476, which may connect to off-page connector 304 in FIG. 3.

In parallel with resetting the root_beacon timer in step 480, the non-root node may commence receiving frames on its active ports in step 464. When a frame is received, the non-root may confirm the root_ID that may be contained in the frame with a locally stored root identity in step 466. If the root_ID received in the received frame is different from the locally stored root identity, there may have been topology changes to the network because the node transmitting the frame may have considered a different node to be the root node. Hence, the non-root node may trigger root selection mode in step 306 via off-page connector 476, which may connect to off-page connector 304 in FIG. 3.

If in step 466 the root_ID of the received frame is equal to the locally stored root identity, the non-root node may verify whether the received frame may be a root_beacon frame in step 468. In case of a root_beacon frame, the root_beacon timer in step 480 may be reset. If in step 468 the frame is not a root_beacon frame, the non-root node may verify whether the received frame may be a token_pass frame in step 470. If the received frame in step 470 is not a token_pass frame, the frame may be a loop_discovery frame by elimination and the loop_discovery frame may be forwarded on active ports of the non-root node different from the receiving port, in step 472. The node may then commence receiving frames again in step 464. On the other hand, if the received frame in step 470 is a token_pass frame, the non-root node may commence the loop prevention and spanning tree construction algorithm since it may be in possession of the token. Via on-page connectors 474 and 418, the non-root node may then commence the loop discovery and spanning tree construction process in step 420. Operation of the loop prevention and spanning tree construction for the non-root node from step 420 to step 454 may be identical to the root node operation described in detail for step 320 to step 354 in FIG. 3.

After sending the token_pass frame and thereby forwarding the token in step 454, the non-root node may recommence receiving frames in step 464, via on-page connectors 456 and 462.

Figure 5:
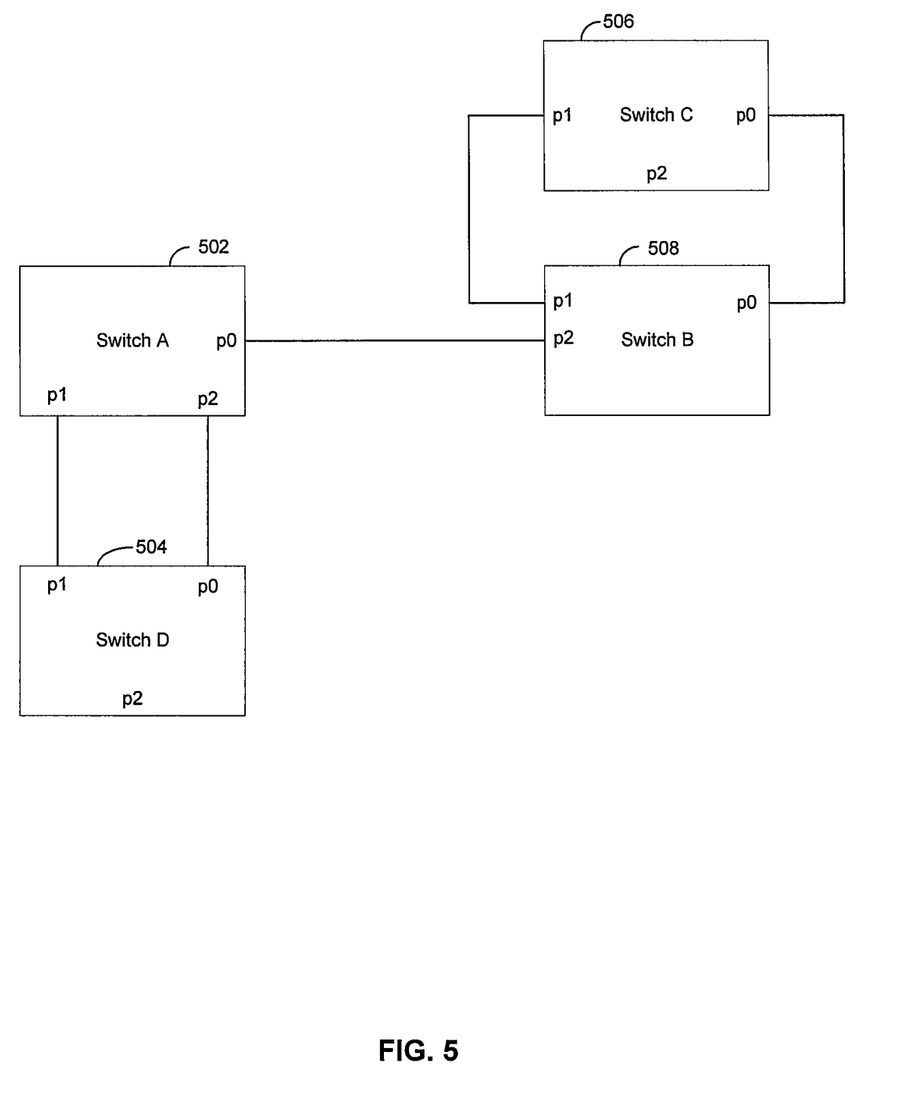
FIG. 5 is a diagram of an exemplary network used to illustrate the functionality of the port maps single_link, loop_port and final_prune, in accordance with an embodiment of the invention.

FIG. 5 is a diagram of an exemplary network used to illustrate the functionality of the port maps single_link, loop_port and final_prune, in accordance with an embodiment of the invention. Referring to FIG. 5, there is shown switches 502, 504, 506 and 508, comprising network ports p0, p1 and p2.

The single_link port map may be used to avoid pruning links associated with loops that may result in severing the network into disjoint parts. A loop_discovery frame may be sent out on switch A 502 at port 0. This loop_discovery frame may be received again at switch A 502, port 0 after looping from switch B 508 to switch C 506 and back. One exemplary path may be from switch A 502, port 0 to switch B 508, port 2, from switch B 508, port 1 to switch C 506, port 1, from switch C 506, port 0 to switch B 508, port 0, and from switch B 508 port 2 back to switch A 502, port 0. Hence, switch A 502 may determine that there may be a loop downstream of the transmitting port 0, as the transmitting port may be identified from the LP_local_port field of the received loop_discovery frame. However, although port 0 may be in a looped condition, it may be seen from FIG. 5 that switch A 502 may not disable port 0 since port 0 may provide the only link to switches B 508 and switch C 506 from switch A 502. The condition for the switch A 502 to ensure that it may prune a link may be that the loop_discovery frame may be received by at least one port different from the transmitting port. From the network configuration shown in FIG. 5, it may be seen that loop_discovery frames from port 0 at switch A 502 may only be received at port 0 and port 0 may therefore not be disabled. On the other hand, loop_discovery frames sent from port 1 and port 2 of switch A 502 may be received by port 2 and port 1, respectively.

An exemplary construction of the port maps loop_port, single_link and final_prune for switch A 502 may be as follows: loop_port and final_prune may be initialized to 000, whereby the bits 000 may correspond to port 2, port 1, port 0. The port map single_link may be initialized to 111 whereby the bits 111 correspond to port 2, port 1, port 0. The loop_discovery frames may be sent on active ports p0, p1 and p2. The loop_discovery frame sent from port 0 may be received on port 0. In this case, LP_local_port of the received loop_discovery frame may be equal to the receiving port, p0. Therefore, logic '1' may be combined with the rightmost bit of single_link ('1') that may correspond to port 0, by logical 'AND'. This logical combination will result in logic '1' for the rightmost bit position of the single_link port map. Hence, the single_link port map may remain unchanged and the rightmost bit of single_link may indicate by the logic '1' that port 0 may not be pruned. The loop_discovery frame sent from port 2 of switch A 502, may be received at port 0 of switch D 504 and then forwarded on port 1 of switch D 504. Since the loop_discovery frame sent from port 2 of switch A 502 may then be received by port 1 of switch A 502, LP_local_port=p2 may not be equal to the receiving port, p1. Therefore, logic '0' may be combined with the leftmost bit of single_link ('1') that may correspond to port 2, by logical 'AND'. This logical combination will result in logic '0' for the leftmost bit position of the single_link port map, thereby indicating that port 2 is a port that may be pruned. Similarly, the loop_discovery frame sent from port 1 of switch A 502 may be received by port 2 of switch A 502 and since LP_local_port may not be equal to the receiving port, the middle bit of the port map single_link may also be set to logic '0'. Therefore, the single_link port map of switch A 502 may be 001 after the received loop_discovery frames may have been evaluated. Since loop_discovery frames from some active ports were received on port 0, port 1 and port 2, the loop_port map will be set to 111, indicating that port 2, port 1, port 0 are in a looped condition. By combining the port maps single_link and loop_port, the port map final_prune may be created. The port map final_prune indicates by logic '1' those ports from which one port may be chosen to be disabled. The condition for a '1' in final_prune for a corresponding port may be that the port is in looped condition and the port may not be a single link. Hence, the port map final_prune may be constructed by the following logical combination of the port maps:

$$\text{final\_prune} = \text{loop\_port} \wedge \overline{\text{single\_link}}$$

where ^ may denote logical 'AND' and overlined may denote negated. In the example started above, single_link may be 001 and loop_port may be 111 and the resulting final_prune port map may be 110, indicating that port 2 and port 1 may be disabled. As may be seen from FIG. 5, port 2 and port 1 may however not be disabled at concurrently and hence the port map final_prune may provide a list of ports of which one port may be disabled. For further pruning by disabling ports, a new final_prune map may be constructed, which may account for the changes in network topology due to the previously disabled port.

In accordance with an embodiment of the invention, a method and system for a low-complexity spanning tree algorithm in communication networks may comprise preventing loops in a communications network utilizing a distributed sequential algorithm as illustrated in FIG. 2, FIG. 3 and FIG. 4 and in which there is a single token, as discussed in FIG. 2. Only a network node in possession of this single token may disable a network port, as shown in step 212 of FIG. 2. As shown in FIG. 1, a spanning tree may be generated based on loop prevention. The network ports that may be disabled may be chosen from a port map, where the port map may be obtained by combining a port map identifying ports that are connected to loops with a port map indicating network ports that are to remain enabled. This is illustrated in FIG. 3 and FIG. 4. The network ports that are to remain enabled may comprise single link ports, as shown, for example, in steps 338, 340 and 438 and 440 in FIG. 3 and FIG. 4. As explained for FIG. 2, the loop prevention may be initiated by a root node and a token may be generated by the root node when completing preventing. Loops may be detected by using loop discovery frames, shown in steps 324 and 424. In FIG. 3 and FIG. 4, there is shown that network nodes may reduce ingress data rate during loop prevention in steps 332 and 432, respectively.

Another embodiment of the invention may provide a machine-readable storage, having stored thereon, a computer program having at least one code section executable by a machine, thereby causing the machine to perform the steps as described above for a low-complexity spanning tree algorithm in communication networks.

Accordingly, the present invention may be realized in hardware, software, or a combination of hardware and software. The present invention may be realized in a centralized fashion in at least one computer system or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for processing signals in a communications system having a plurality of nodes connected to a communications network, the method comprising:
creating a token at a root node of the plurality of nodes as part of a sequential algorithm that is completed by one or more of the plurality of nodes, a node with the token being an active node, the algorithm including
detecting, by the active node, if there is a loop in the communications network in which a broadcast packet has a path back to a sending node of the broadcast packet over active links in the communications network;
when the active node does not detect a loop, terminating the algorithm;
when the active node does detect a loop, disabling any network ports at the active node that are part of the loop and which can be disabled, and passing the token to another node in the loop via an outgoing network port which has not been disabled, and when the another node is not the root node, the another node becomes the active node by receiving the token and resumes the algorithm at the detecting step, and when the another node is the root node the algorithm is terminated.

2. The method according to claim 1, comprising generating a spanning tree based on said algorithm.

3. The method according to claim 1, comprising selecting said network port for said disabling based on a port map of said active node.

4. The method according, to claim 3, comprising generating said port map by combining a port map identifying network ports that connect to said loops with a port map that indicates network ports that are to remain enabled.

5. The method according to claim 4, wherein said network ports that are to remain enabled comprise single link ports.

6. The method according to claim 1, wherein the detecting of said loops is achieved using loop discovery frames.

7. The method according to claim 1, wherein said active node reduces an ingress data rate during said algorithm.

8. A system for processing signals in a communications system, the system comprising:
a plurality of nodes connected to a communications network, at least one of the plurality of nodes is configured to be a root node that creates a token as part of a sequential algorithm that is completed by one or more of the plurality of nodes, and each of the plurality of nodes is configured to
receive the token and become an active node;
detect, as the active node, if there is a loop in the communications network in which a broadcast packet has a path back to a sending node of the broadcast packet over active links in the communications network;
when not detecting a loop, terminate the algorithm;
when detecting a loop, disable any network ports that are part of the loop and which can be disabled, and passing the token to another node in the loop via an outgoing network port which has not been disabled, and when the another node is not the root node, the another node becomes the active node by receiving the token and resumes the algorithm at the detecting step, and when the another node is the root node the algorithm is terminated.

9. The system according to claim 8, wherein said one or more plurality of nodes generates a spanning tree based on said algorithm.

10. The system according to claim 8, wherein said active node selects a network port to be disabled based on a port map of said network node.

11. The system according to claim 10, wherein said active node generates said port map by combining a port map identifying network ports that connect to said loops with a port map that indicates network ports that are to remain enabled.

12. The system according to claim 11, wherein said network ports that are to remain enabled comprise single link ports.

13. The system according to claim 8, wherein said one active node detects said loops by using loop discovery frames.

14. The system according to claim 8, wherein said active node reduces an ingress data rate during said algorithm.

* * * * *